No. 798,692. PATENTED SEPT. 5, 1905.
R. MÜLLER.
CHAIN HOLDING DEVICE FOR CHAIN WELDING MACHINES.
APPLICATION FILED AUG. 17, 1904.
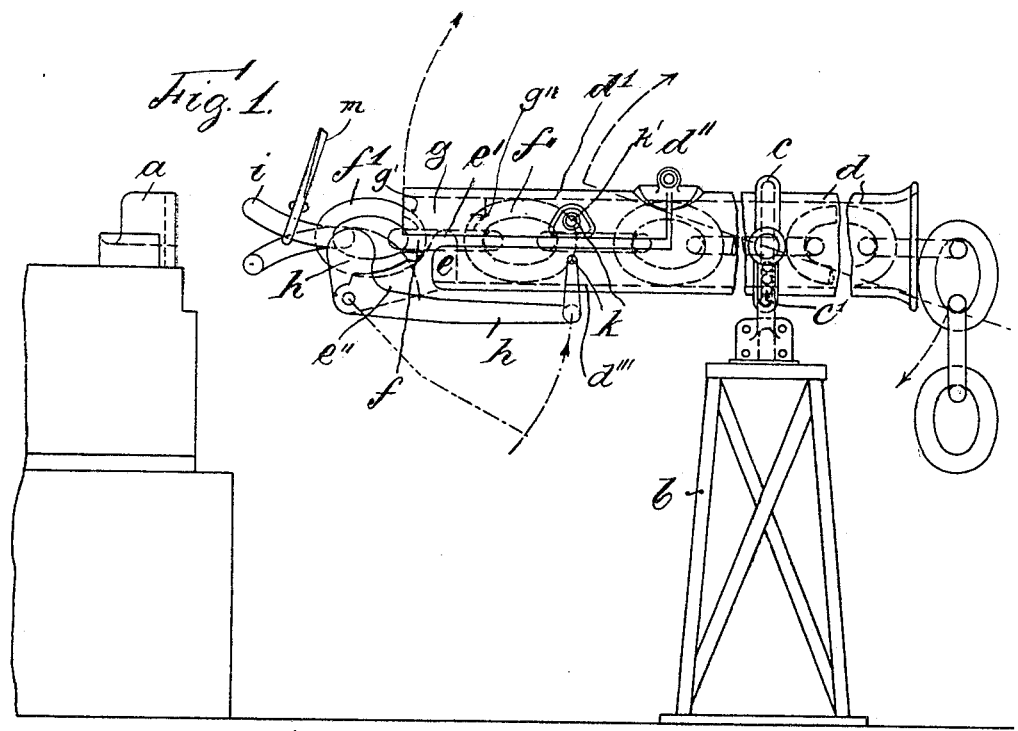
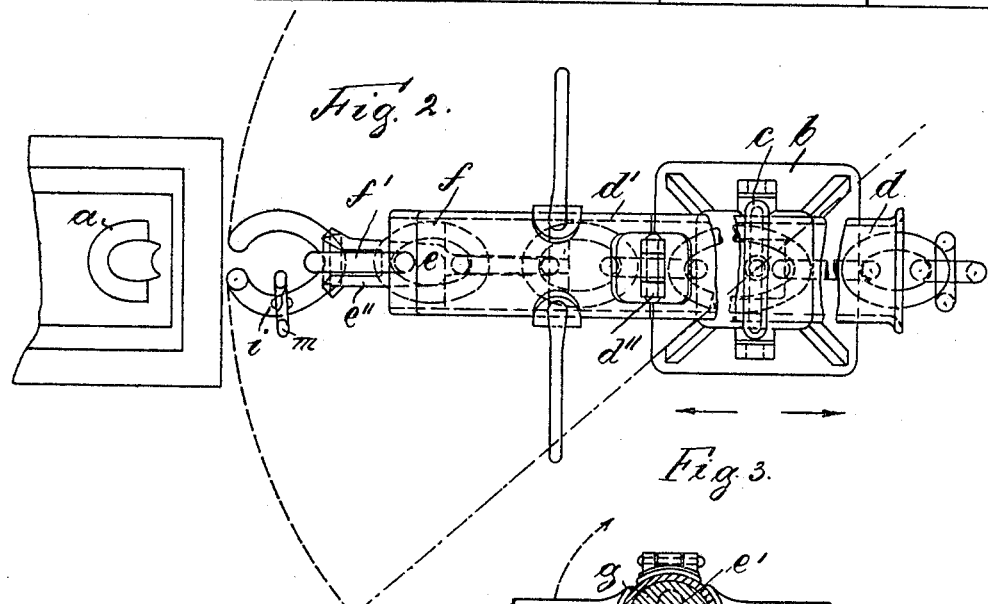
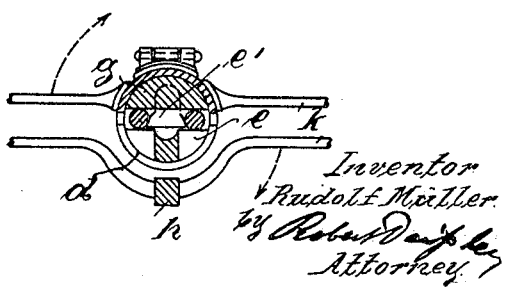

UNITED STATES PATENT OFFICE.

RUDOLF MÜLLER, OF GOTHENBURG, SWEDEN, ASSIGNOR TO THE FIRM OF MASCHINENFABRIK ST. GEORGEN BEI ST. GALLEN COMMANDIT-GE-SELLSCHAFT LUDWIG VON SÜSSKIND, OF ST. GALL, SWITZERLAND.

CHAIN-HOLDING DEVICE FOR CHAIN-WELDING MACHINES.

No. 798,692.      Specification of Letters Patent.      Patented Sept. 5, 1905.

Application filed August 17, 1904. Serial No. 221,163.

*To all whom it may concern:*

Be it known that I, RUDOLF MÜLLER, engineer, a subject of the German Emperor, and a resident of Styrsö Tange, city of Gothenburg, in the Kingdom of Sweden, have invented certain new and useful Improvements in Chain-Holding Devices for Chain-Welding Machines, of which the following is an exact specification.

My invention relates to chain-holding devices for chain-welding machines, and has for its purpose to facilitate the welding of especially heavy and strong chains to which new open links are to be added. If a workman holds a chain by means of tongs and turns the chain during the welding process, the chain twists itself around these tongs, whereby the handling is rendered extremely difficult. This disadvantage is avoided by my present invention. Furthermore, my holding device is so constructed that the end links of the chain and the heated open link to be welded can be kept in fixed position with regard to each other, in which relative positions they can easily be brought onto the welding-die and withdrawn from the same after the welding is finished.

In order to make my invention more clear, I refer to the accompanying drawings, in which—

Figure 1 is a side view of a suitable form of my chain-holding device. Fig. 2 is a plan view, and Fig. 3 is a vertical section through the holding device.

$a$ is the welding-die of a welding-machine. $b$ is a support placed some distance away from the welding-die. $c$ is a ball-race ring fastened to or pivotally mounted on this support, a tubular part $d$ being carried by the balls $c'$ in the ring, so that this body $d$ can easily be turned and longitudinally displaced.

$d'''$ is a half-cylindrical extension or projection, and $e$ is a cross piece or web at the front end thereof.

The tube $d$ is provided with fixed and movable supports for the last but one horizontal link.

$e'$ is an upward projection in the middle of the web $e$.

$e''$ is an arm projecting from the web $e$ and provided with a groove, into which a link $f'$ is placed on edge. At the end of the arm $e''$ a bell-crank lever $h$ is hinged. The long arm of this lever carries handles $k$. The short arm of the lever $h$ is forked, so as to be able to embrace the link $f'$, and the upper inner edges of the fork are cut away, so that a bit is formed, by means of which the lever $h$ can maintain the open link $i$, which is to be welded to the already-finished chain, in the position shown in Fig. 1.

Above the half-cylindrical projection $d'''$ a cover $d'$ is provided, hinged at $d''$. At the front end of this cover a web $g$ is fitted inside and is provided at opposite ends with recesses $g'$ $g''$, so that when the cover is closed down the vertically-placed links fit into these recesses and, as shown in Fig. 1, are pressed and held apart. The cover $d'$ further carries on each side a handle $k'$, situated immediately over the handles $k$, so that a workman can take hold of both pairs of handles $k$ $k'$ at the same time and perform the various movements of the tubular body.

The holding device is operated as follows: Suppose an open link $i$ is to be welded to a piece of chain. One end of this chain is put into the tube $d$, the other end being left hanging down. The last but one link $f$ of this chain is placed upon the web $e$ around the projection or stud $e'$, the cover $d'$ being turned up through about ninety degrees and the lever $h$ being free, so that the latter takes the position indicated in Fig. 1 by dotted lines. The workman now turns down the cover $d'$, so that the cross-web $g$ enters the space between the last link and the third link from the end, (marked $f'$ $f''$, respectively,) and maintains these links firmly apart in the position shown in Fig. 1. The heated open link $i$ to be welded is then brought by means of the tongs $m$ and put into the last link $f'$. The bell-crank lever $h$ is now turned up by means of the handles $k$, so that the bit-like shorter arm of the lever $h$ comes against the open link $i$ and keeps it tightly against the link $f'$. Now the workman who controls the tube and the chain by means of the handles $k$ and $k'$ moves the tubular part and brings the open link over the die, so that a welding of the open link can be effected. He can now remove the link, turn it over, and replace it on the die by revolving the tubular body so that the other side of the link may now be hammered. After finishing the welding of the link $i$ the tube is withdrawn from the welding-die, the cover $d'$ is turned up, the angle-lever $h$ is released, so that the chain can be taken off from the stud $e'$, the link $f'$, which now becomes the last but one of the finished links, is horizontally placed around the stud $e'$, and the cover $d'$ is then turned down, whereby the chain is held in position for a new open link to be added in the same manner as above described.

This holding device offers the great advantage that the chain cannot be in the way during the welding process. It can easily be handled. The link to be welded can easily be brought to the welding-die and revolved, while that part of the chain which lies within the holding-tube becomes somewhat twisted without causing serious twisting of the main part of the chain outside the holding-tube, which would be inconvenient.

Having thus fully described the nature of my invention, what I desire to secure by Letters Patent of the United States is—

1. In a chain-holding device for chain-welding machines, the combination with a support, of a tube-like body, means upon said support for carrying said body so as to permit a longitudinal and a rotary movement of said body and means fastened to the tube-like body for keeping fast the link to which a further link is to be added but allowing twisting of the chain part within said body so as to prevent the chain part outside the tube from being twisted, substantially as described and for the purpose set forth.

2. In a chain-holding device for chain-welding machines, the combination with a support, of a tube-like body, means upon said support for carrying said body so as to permit a longitudinal and a rotary movement of said body, and a clamping device within the tube-like body for keeping the last links of the chain, to which a link is to be welded in a fixed stretched position to each other, but allowing twisting of the other chain part within said body so as to prevent the chain part outside the tube from being twisted substantially as described and for the purpose set forth.

3. In a chain-holding device, the combination with a support, of a tube-like body, an extension at the end of said body, a cover hinged to the tube-like body, a clamping device for keeping the last links of a chain in a fixed stretched position to each other, said clamping device being mounted partly upon said extension and partly upon said cover, substantially as described and for the purpose set forth.

4. In a chain-holding device, the combination with a support, of a tube-like body, means upon said support for carrying said body, means at the end of said body for keeping the last link of the chain in a fixed position to this body, and a bent lever for holding the heated open link to be added to the last link in fixed position to the latter, substantially as described and for the purpose set forth.

5. In a chain-holding device, the combination with a support, of a tube-like body, an extension at the end of said body, a cover hinged to said body, a clamping device for keeping the last links of a chain in fixed position to each other, this device being mounted partly upon said extension and partly upon said cover, a bent lever for holding the link to be added to the last link in fixed position to the latter, and handles at said bent lever and cover, by means of which handles both the bent lever and the cover can simultaneously be kept in the closed position, substantially as described and for the purpose set forth.

In testimony whereof I have signed my name to this specification in the presence of two subscribing witnesses.

RUDOLF MÜLLER.

Witnesses:
F. W. HOECK,
C. WIED.